(12) United States Patent
Mou et al.

(10) Patent No.: US 12,049,885 B2
(45) Date of Patent: *Jul. 30, 2024

(54) MICRO DETECTING DEVICE

(71) Applicant: MICROJET TECHNOLOGY CO., LTD., Hsinchu (TW)

(72) Inventors: Hao-Jan Mou, Hsinchu (TW); Yung-Lung Han, Hsinchu (TW); Chi-Feng Huang, Hsinchu (TW); Wei-Ming Lee, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 1010 days.

This patent is subject to a terminal disclaimer.

(21) Appl. No.: 16/892,489

(22) Filed: Jun. 4, 2020

(65) Prior Publication Data
US 2020/0392954 A1 Dec. 17, 2020

(30) Foreign Application Priority Data
Jun. 14, 2019 (TW) .................................. 108120710

(51) Int. Cl.
*F04B 43/04* (2006.01)
*B64C 39/02* (2023.01)
(Continued)

(52) U.S. Cl.
CPC .......... *F04B 43/046* (2013.01); *B64C 39/024* (2013.01); *B64D 47/00* (2013.01);
(Continued)

(58) Field of Classification Search
CPC ............. F16K 99/0015; F16K 99/0048; F16K 2099/0094; B64C 39/024; B64D 47/00; G01W 1/08; H01Q 21/06; B60L 2220/10
See application file for complete search history.

(56) References Cited

U.S. PATENT DOCUMENTS 9,304,081 B2 * 4/2016 Rennó ..................... G01N 21/55
2004/0204915 A1 * 10/2004 Steinthal ................ B82Y 30/00
702/30

FOREIGN PATENT DOCUMENTS

CN 204822096 U 12/2015
CN 102105357 B 4/2016
(Continued)

*Primary Examiner* — Jill A Warden
*Assistant Examiner* — Michael Stanley Gzybowski
(74) *Attorney, Agent, or Firm* — Birch, Stewart, Kolasch & Birch, LLP

(57) ABSTRACT

A micro detecting device includes a controller and a mobile device. The controller has a first wireless communication module. The mobile vehicle includes a vehicle body; a processor, accommodated in the vehicle body; a second wireless communication module, accommodated in the vehicle body and electrically connected to the processor; a power actuator, disposed on the vehicle body and electrically connected to the processor for driving the vehicle body; a recording unit, disposed on the vehicle body and electrically connected to the processor and the second wireless communication module, and the recording unit is configured to generate a recorded signal; and a fluid detecting unit, disposed on the vehicle body and electrically connected to the processor and the second wireless communication module, and the fluid detecting unit is configured to generate a detection signal.

18 Claims, 14 Drawing Sheets

(51) Int. Cl.
*B64D 47/00* (2006.01)
*F16K 99/00* (2006.01)
*G01W 1/08* (2006.01)
*H01Q 21/06* (2006.01)

(52) U.S. Cl.
CPC ........... F16K 99/0015 (2013.01); G01W 1/08 (2013.01); H01Q 21/06 (2013.01); *B60L 2220/10* (2013.01); *F16K 99/0048* (2013.01); *F16K 2099/0094* (2013.01)

(56) References Cited

FOREIGN PATENT DOCUMENTS

| | | |
|---|---|---|
| CN | 205168902 U | 4/2016 |
| CN | 209142389 U | 7/2019 |
| TW | M339478 U | 9/2008 |

* cited by examiner

MICRO DETECTING DEVICE

CROSS-REFERENCE TO RELATED APPLICATION

This non-provisional application claims priority under 35 U.S.C. § 119(a) to Patent Application No. 108120710 filed in Taiwan, R.O.C. on Jun. 14, 2019, the entire contents of which are hereby incorporated by reference.

BACKGROUND

Technical Field

The present disclosure relates to a micro detecting device. In particular, to a micro detecting device capable of generating a pushing force to move a mobile vehicle by discharging a fluid, wherein the mobile vehicle has a recording unit and a fluid detecting unit.

Related Art

Modern people are paying more and more attention to the negative impact on human health resulting from living environment, such as air quality, water quality, and other life factors. With regard to air quality, most measurements at current adopt fixed-point measurement, so that the obtained air quality information only represents the air quality around the measuring station at best, and whether the environment of other specific places may affect human body or not is unknown. Consequently, some mobile vehicles are equipped with a detecting unit for a user. The user may operate the mobile vehicle and make it move toward a destination and perform detection for that place through the detecting unit. However, all of the current mobile vehicles utilize motors, engines, and the like as a driving power source to drive the mobile vehicles. These traditional driving devices often need a certain volume to accommodate the internal core components for outputting the required kinetic energy. As a result, the size of the traditional driving devices is difficult to be reduced. In the era that the development trend of high-tech products tends to miniaturization and the high-tech products are getting smaller, these traditional driving devices are difficult to be applied to the nowadays high-tech products. Particularly, the current mobile vehicles, such as an unmanned aerial vehicle (UAV), are developed to be miniaturized, to have high concealment, and to have high mobility. The traditional driving devices cannot meet the requirements of the current mobile vehicles. As a result, the unmanned aerial vehicles are difficult to be miniaturized, and the application of the unmanned aerial vehicles is limited by the areas/situations and cannot be popularized. Moreover, the annoying noise generated by the driving devices during operation is also a problem that the current driving device cannot overcome.

Accordingly, there is a need for developing a miniaturized mobile vehicle to solve the problems of limited usage situations and the noise during operation.

SUMMARY

In general, one or the objects of present disclosure is to provide a micro detecting device, which utilizes a power actuator to transmit and discharge fluid, and the micro detecting device further utilizes the pressure generated by the discharged fluid to push the mobile vehicle, so that the mobile vehicle can be moved smoothly. In addition, the micro detecting device can transmit the recorded signal and the detection signal of the position where the mobile vehicle locates at back to the user, wherein the recorded signal and the detection signal are respectively generated by the recording unit and the fluid detecting unit disposed on the mobile vehicle.

To achieve the above mentioned purpose(s), a general embodiment of the present disclosure provides a micro detecting device, including a controller and a mobile vehicle. The controller has a first wireless communication module. The mobile vehicle includes a vehicle body, a processor, a second wireless communication module, a power actuator, a recording unit, and a fluid detecting unit. The processor is accommodated in the vehicle body. The second wireless communication module is accommodated in the vehicle body and electrically connected to the processor. The second wireless communication module is configured to establish a communication connection with the first wireless communication module to receive a control signal from the controller. The power actuator is disposed on the vehicle body and electrically connected to the processor for driving the vehicle body. The recording unit is disposed on the vehicle body and electrically connected to the processor and the second wireless communication module. The recording unit is configured to generate a recorded signal. The fluid detecting unit is disposed on the vehicle body and electrically connected to the processor and the second wireless communication module. The fluid detecting unit is configured to generate a detection signal.

BRIEF DESCRIPTION OF THE DRAWINGS

The disclosure will become more fully understood from the detailed description given herein below for illustration only, and thus not limitative of the disclosure, wherein.

DETAILED DESCRIPTION

The present disclosure will now be described more specifically with reference to the following embodiments. It is to be noted that the following descriptions of different embodiments of this disclosure are presented herein for purpose of illustration and description only, and it is not intended to limit the scope of the present disclosure.

Figure 1:
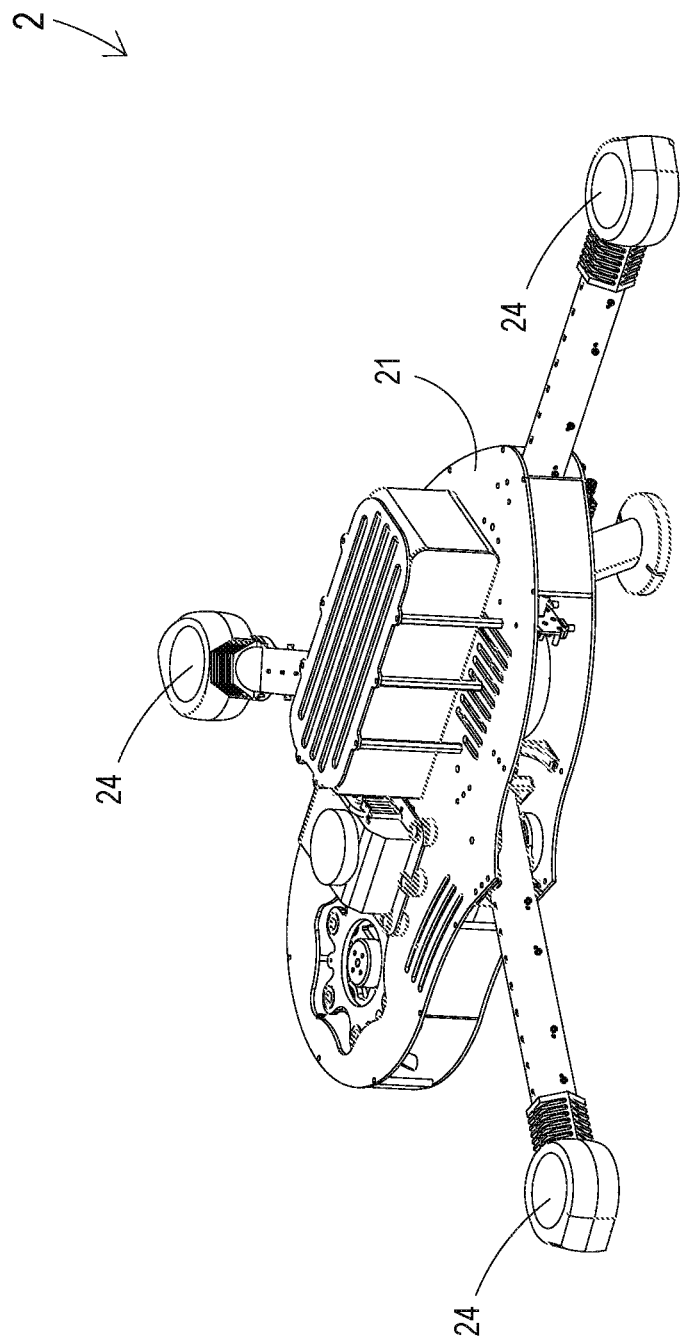
FIG. 1 illustrates a schematic perspective view of a micro detecting device according to an exemplary embodiment of the present disclosure.
Figure 2A:
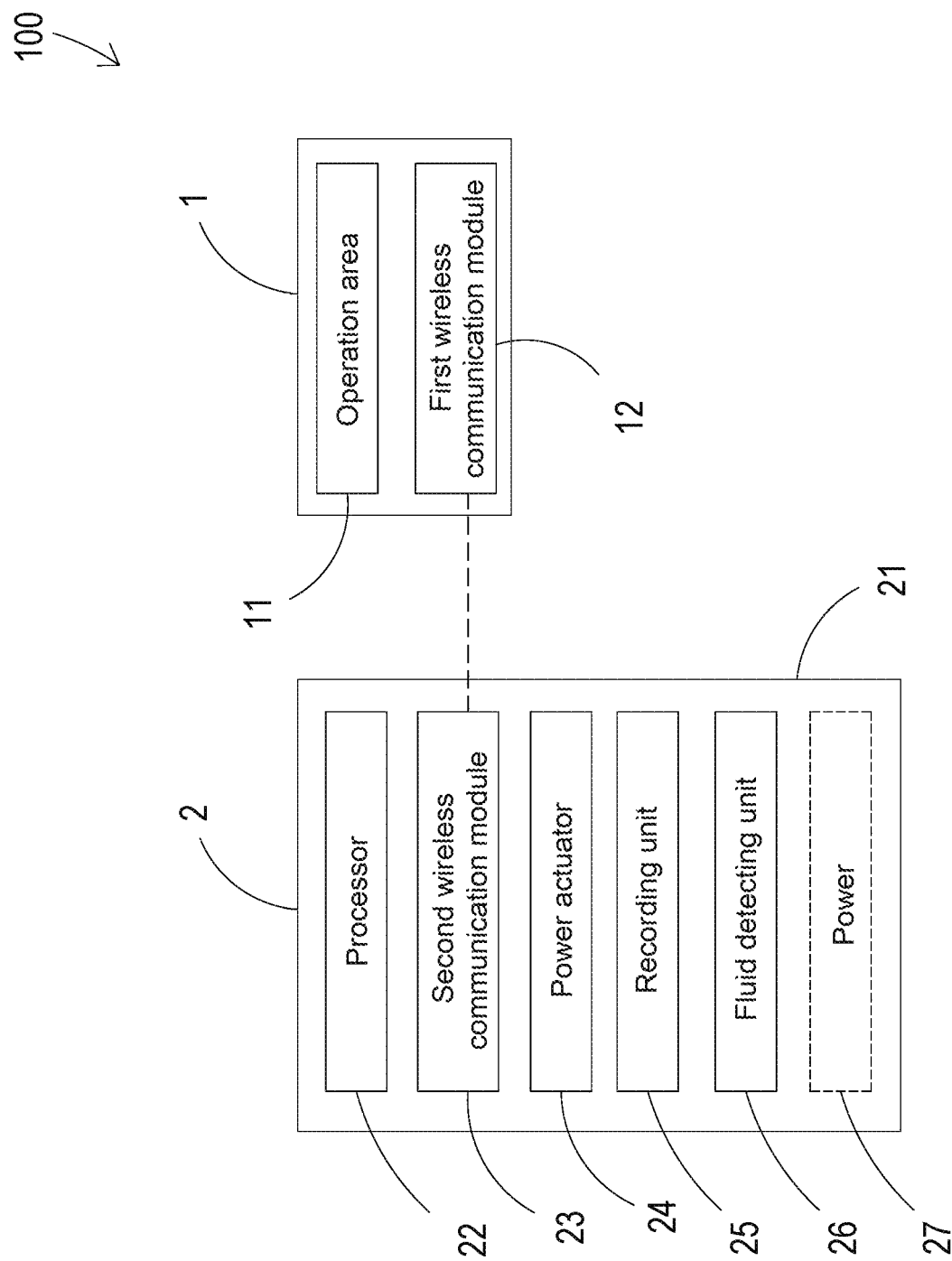
FIG. 2A illustrates a block diagram of the micro detecting device according to the exemplary embodiment of the present disclosure.

Please refer to FIG. 1 and FIG. 2A. FIG. 1 illustrates a schematic perspective view of a micro detecting device according to an exemplary embodiment of the present disclosure. FIG. 2A illustrates a block diagram of the micro detecting device according to the exemplary embodiment of the present disclosure. The present disclosure provides a micro detecting device 100, which includes a controller 1 and a mobile vehicle 2. The controller 1 has an operation area 11 and a first wireless communication module 12. The operation area 11 is electrically connected to the first wireless communication module 12. A user may control the mobile vehicle 2 through the operation area 11 of the controller 1. The operation area 11 generates a control signal according to an instruction input by the user and sends the control signal through the first wireless communication module 12. The mobile vehicle 2 has a vehicle body 21, a processor 22, a second wireless communication module 23, a power actuator 24, a recording unit 25, and a fluid detecting unit 26. The processor 22 is accommodated in the vehicle body 21. The second wireless communication module 23 is accommodated in the vehicle body 21 and electrically connected to the processor 22, and the second wireless communication module 23 is configured to establish a communication connection with the first wireless communication module 12 of the controller 1 to receive the control signal and transmit the control signal to the processor 22. The power actuator 24 is disposed on the vehicle body 21 and is electrically connected to the processor 22, so that the processor 22 can drive the power actuator 24 to push the mobile vehicle 2 according to the control signal, and thus the mobile vehicle 2 starts to move according to the control signal. The recording unit 25 is disposed on the vehicle body 21, and electrically connected to the processor 22 and the second wireless communication module 23. The recording unit 25 can generate a recorded signal, and transmits the recorded signal to the processor 22 and the second wireless communication module 23. The fluid detecting unit 26 is disposed on the vehicle body 21, and electrically connected to the processor 22 and the second wireless communication module 23. The fluid detecting unit 26 generates a detection signal, and transmits the detection signal to the processor 22 and the second wireless communication module 23.

Figure 2B:
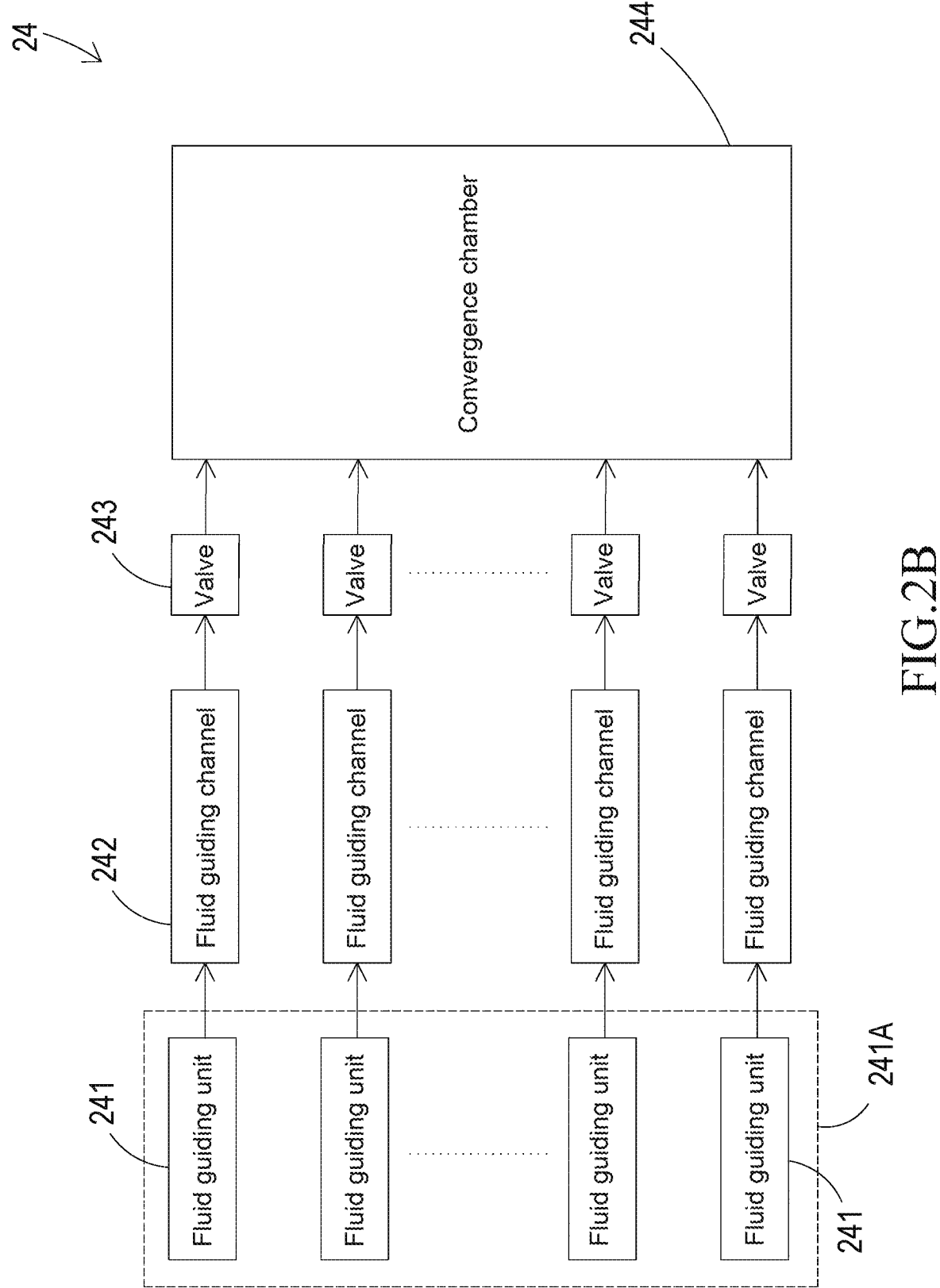
FIG. 2B illustrates a block diagram of a power actuator according to the exemplary embodiment of the present disclosure.

Please refer to FIG. 2B. FIG. 2B illustrates a block diagram of a power actuator according to the exemplary embodiment of the present disclosure. The power actuator 24 has a plurality of fluid guiding units 241, a plurality of fluid guiding channels 242, a plurality of valves 243, and a convergence chamber 244. An area where the fluid guiding units 241 lie forms a driving area 241A. In other word, the fluid guiding units 241 locate at a specific region, and such region forms the driving area 241A. The fluid guiding channels 242 are in communication with the fluid guiding units 241 at the driving area 241A, thereby transmitting the fluid guided in the power actuator 24 by the fluid guiding units 241. The valves 243 are connected to the plurality of fluid guiding channels 242, respectively, and then the valves 243 are connected to the convergence chamber 244. The amount and the pressure of the fluid in the convergence chamber 244 are regulated and controlled through on/off operation of the valves 243. That is, in this embodiment, the fluid guiding units 241 in the driving area 241A draw the fluid and transmit the fluid into the fluid guiding channels 242, and the valves 243 can be utilized to control the flow rate and the pressure of the fluid to be converged at the convergence chamber 244. Last, the fluid in the convergence chamber 244 is discharged out so as to generate a pushing force for moving the mobile vehicle 2. Thus, the mobile vehicle 2 can be moved by the pushing force generated through the operation of continuously drawing and discharging the fluid by the power actuator 24.

Please still refer to the FIG. 1. As shown in FIG. 1, the mobile vehicle 2 may be a remote-controlled aircraft, which utilizes the pushing force generated by the power actuator 24 to lift off and/or fly, but is not limited thereto. In some embodiments, the mobile vehicle 2 may also be a remote-controlled car, which similarly utilizes the pushing force generated by the power actuator 24 as a driving force to move the mobile vehicle 2 (remote-controlled car) forward. Moreover, in some embodiments, the mobile vehicle 2 may be a remote-controlled boat or a remote-controlled submarine, which can be moved in the water by the pushing force generated through transmitting the fluid by the power actuator 24. The power actuator 24 can generate a pushing force by transmitting the fluid, and thus can be applied to various mobile vehicles 2 suitable for different use scenarios, thereby greatly reducing the application limitations of the terrain and the environment. Moreover, the mobile vehicles 2 can be miniaturized and lightened as well, which may reduce the energy consumption. Thus, the mobile vehicles 2 having the power actuator 24 possess high industrial applicability.

The controller 1 may be a portable electronic device, such as a smart phone, a tablet computer, or a notebook computer. A portable electronic device can serve as the controller 1 to control the movement of the mobile vehicle 2, and can receive the recorded signal transmitted back to the controller 1 (the portable electronic device) by the recording unit 25 of the mobile vehicle 2 through the second wireless communication module 23, and can receive the detection signal transmitted back to the controller 1 by the fluid detecting unit 26 through the second wireless communication module 23. That is, the portable electronic device may control the movement of the mobile vehicle 2, and may issue control signals to the recording unit 25 and the fluid detecting unit 26, for image information and environmental information, respectively, during its journey. After capturing images and sensing operation, the recording unit 25 and the fluid detecting unit 26 transmit signals (the recorded signal and the detection signal) back to the portable electronic device. Therefore, the user can know the image and the environmental information of the position where the mobile vehicle 2 locates at.

The recording unit 25 is configured to generate a recorded signal from the image/video recorded by the recording unit 25 during the movement of the mobile vehicle 2, and the recorded signal is transmitted back to the controller 1 for user's observation. Alternatively, the recording unit 25 may also be an infrared detection unit for detecting the existence of a human body, a flame, or the like. In a further option, the recording unit 25 may be an optical radar detection unit, which uses light or laser to form image(s) for detection.

Figure 3A:
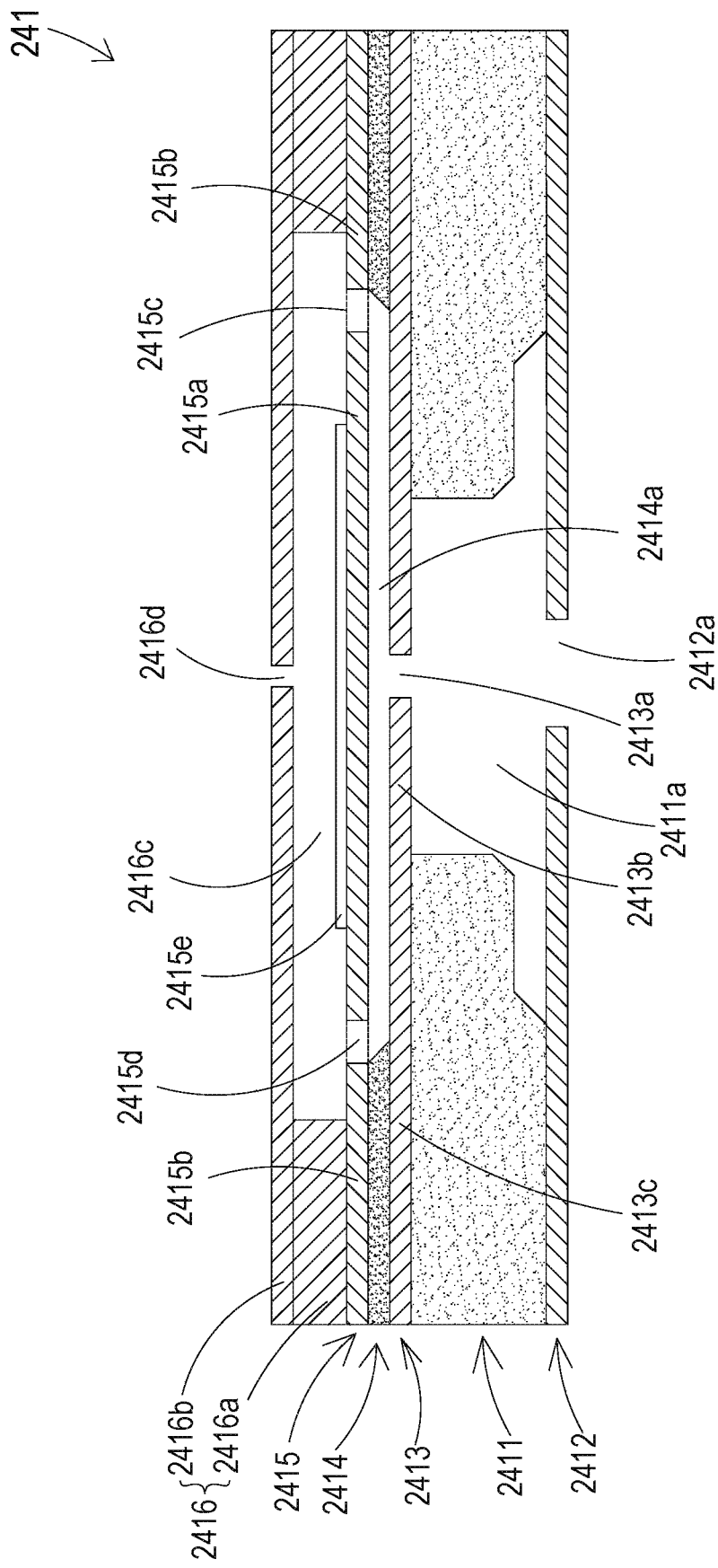
FIG. 3A illustrates a schematic cross-sectional view of a fluid guiding unit according to the exemplary embodiment of the present disclosure.
Figure 3B:
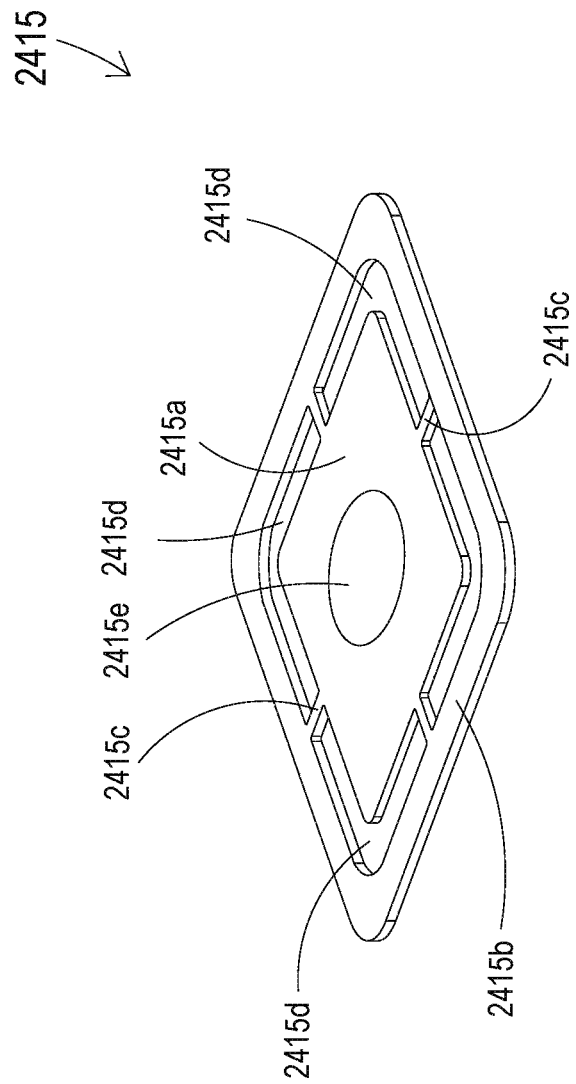
FIG. 3B illustrates a schematic perspective view of an actuating element according to the exemplary embodiment of the present disclosure.

Please refer to FIG. 3A and FIG. 3B. FIG. 3A illustrates a schematic cross-sectional view of a fluid guiding unit according to the exemplary embodiment of the present disclosure. FIG. 3B illustrates a schematic perspective view of an actuating element according to the exemplary embodiment of the present disclosure. Each of the fluid guiding units 241 has a base 2411, an inlet plate 2412, a resonance plate 2413, a spacing element 2414, an actuation element 2415, and an outlet component 2416. The base 2411 has an inlet hole 2411a. The inlet plate 2412 is disposed on one side of the base 2411 (e.g. the inlet plate 2412 may be disposed on the lower side of the base 2411, but is not limited thereto). The inlet plate 2412 has at least one inlet port 2412a, and the inlet port 2412a communicates with the inlet hole 2411a of the base 2411. The resonance plate 2413 is disposed on the other side of the base 2411 (e.g. the resonance plate 2413 may be disposed on the upper side of the base 2411, but is not limited thereto), and the resonance plate 2413 is opposite to and spaced apart from the inlet plate 2412. In other words, the base 2411 has two opposite sides, and the inlet plate 2412 is disposed on one side thereof and the resonance plate 2413 is disposed on the other side opposite to the inlet plate 2412. The resonance plate 2413 has a central perforation 2413a, a movable portion 2413b, and a fixation portion 2413c. The central perforation 2413a locates at the center portion of the resonance plate 2413 and perpendicularly corresponds to the inlet hole 2411a of the base 2411. The movable portion 2413b is a portion that locates around the periphery of the central perforation 2413a and corresponds to the inlet hole 2411a so that the movable portion 2413b can vibrate upwardly and downwardly at the position where the inlet hole 2411a locates. The fixation portion 2413c is a portion that locates around the periphery of the resonance plate 2413 for the purpose of fixing the resonance plate 2413 to the base 2411. The spacing element 2414 is disposed at the fixation portion 2413c of the resonance plate 2413. The center portion of the spacing element 2414 is recessed, so that the center portion of the spacing element 2414 and the resonance plate 2413 together define a spacing chamber 2414a. The actuating element 2415 is disposed on the spacing element 2414 and has a vibration portion 2415a, an outer frame portion 2415b, a plurality of connecting portions 2415c, a plurality of gaps 2415d, and a piezoelectric element 2415e. The vibration portion 2415a is at the center portion of the actuating element 2415 and perpendicularly corresponds to the spacing chamber 2414a. The connecting portions 2415c are disposed and connected between the vibration portion 2415a and the outer frame portion 2415b for providing a flexible support for the vibration portion 2415a. The gaps 2415d are formed among the vibration portion 2415a, the outer frame portion 2415b, and the plurality of connecting portions 2415c for allowing the fluid to flow therethrough. The piezoelectric element 2415e is attached on the vibration portion 2415a. The outlet component 2416 has a frame plate 2416a and a cover plate 2416b. The frame plate 2416a is stacked on the outer frame portion 2415b of the actuating element 2415. The center portion of the frame plate 2416a is recessed, so that the center portion of the frame plate 2416a and the vibration portion 2415a of the actuating element 2415 together define an outlet chamber 2416c. The cover plate 2416b is stacked on the frame plate 2416a, and an outlet port 2416d is at the center portion of the cover plate 2416b. When the piezoelectric element 2415e is deformed owing to the piezoelectric effect, the piezoelectric element 2415e drives the vibration portion 2415a of the actuating element 2415 to vibrate upwardly and downwardly between the outlet chamber 2416c and the spacing chamber 2414a, thereby changing the volume of the outlet chamber 2416c and the volume of the spacing chamber 2414a. Thus, a pressure difference between the outlet chamber 2416c and the spacing chamber 2414a can be generated, and thereby such pressure difference accelerates the flow of fluid. The fluid flows into the fluid guiding unit 241 from the inlet port 2412a, and passes through the inlet hole 2411a, the central perforation 2413a, the plurality of the gaps 2415d and the outlet chamber 2416c. Finally, the fluid is discharged out of the fluid guiding unit 214 from the outlet port 2416d. Accordingly, the fluid can be transmitted by the fluid guiding units 241.

Figure 3C:
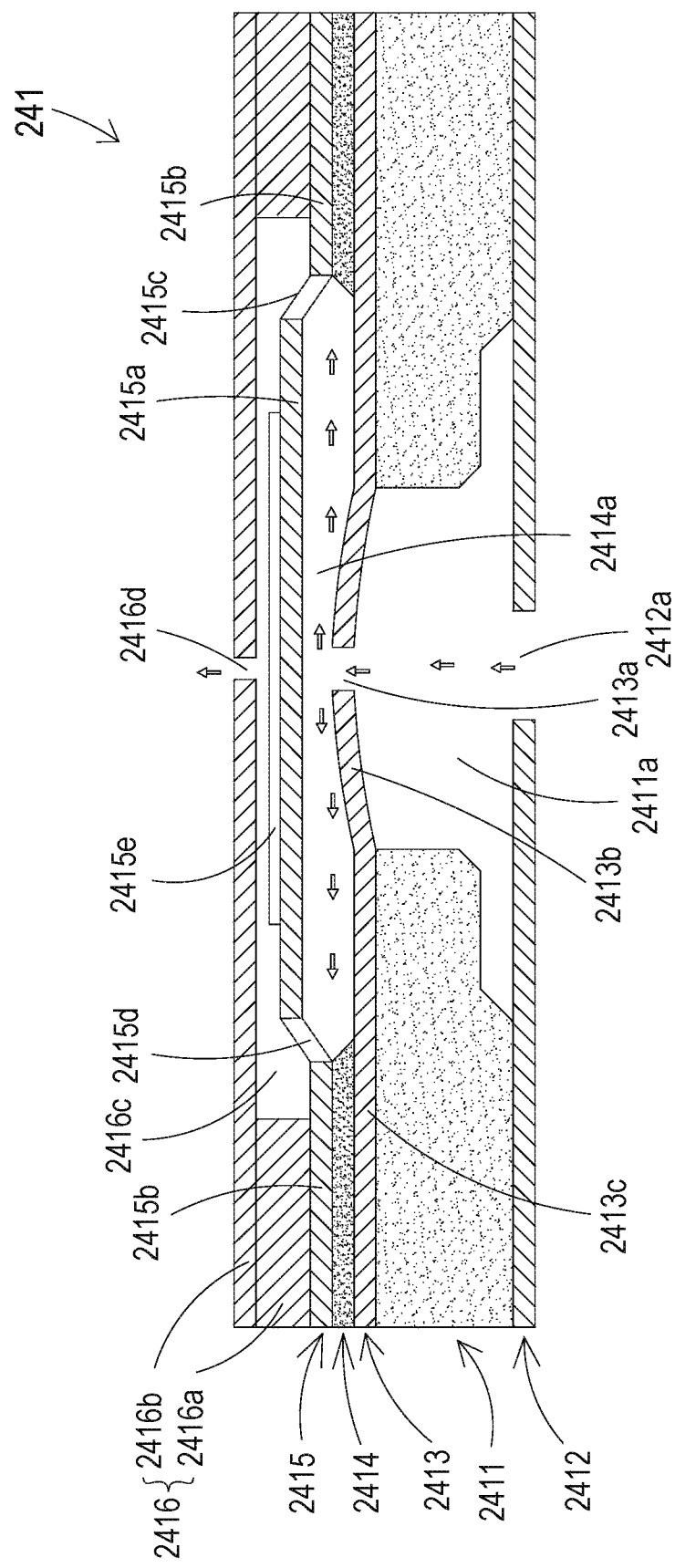
FIG. 3C and FIG. 3D illustrate schematic cross-sectional views of the fluid guiding unit at different operation steps according to the exemplary embodiment of the present disclosure.
Figure 3D:
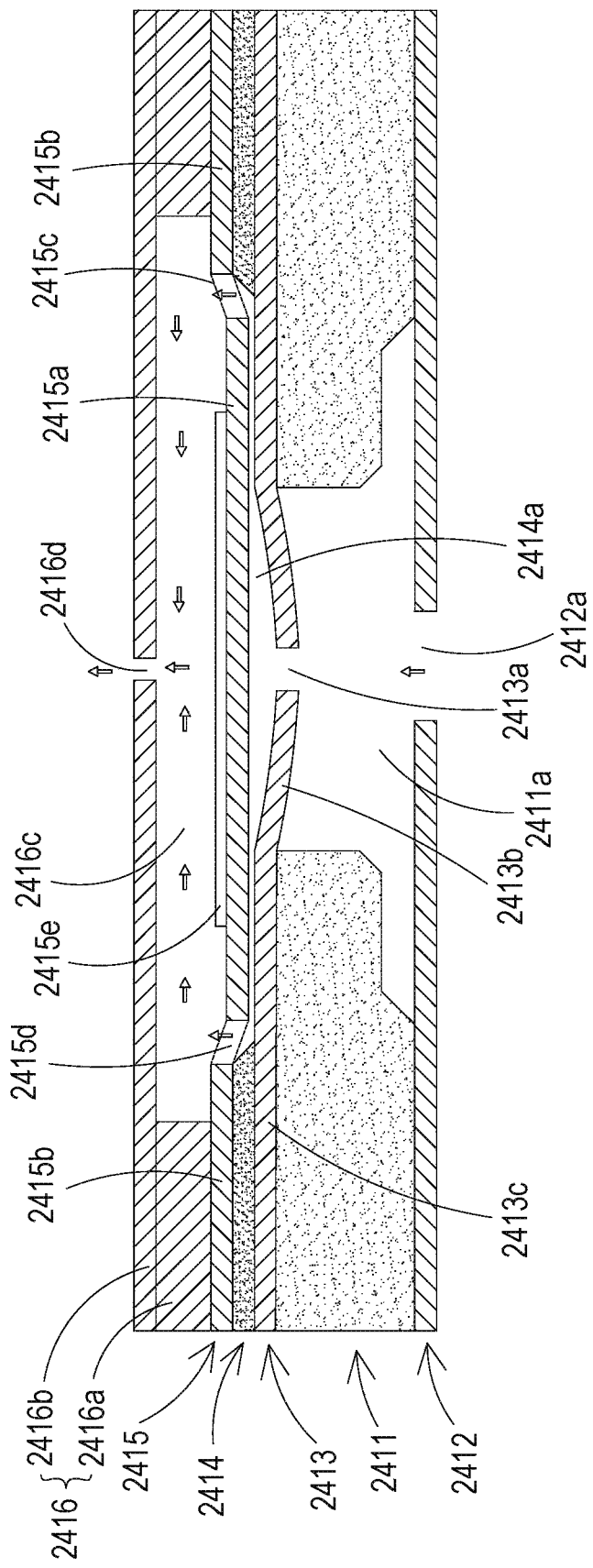

Please refer to FIG. 3C and FIG. 3D. FIG. 3C and FIG. 3D illustrate schematic cross-sectional views of the fluid guiding unit at different operation steps according to the exemplary embodiment of the present disclosure. Please refer to FIG. 3C first, when the piezoelectric element 2415e utilizes the piezoelectric effect to drive the actuating element 2415, the actuating element 2415 may first be driven to move upwardly by the piezoelectric element 2415e, and the movable portion 2413b of the resonance plate 2413 is driven to move upwardly correspondingly through the resonance effect. Since the vibration portion 2415a moves toward the outlet component 2416, the volume of the spacing element 2414a greatly increases, so that the fluid in the inlet hole 2411a starts to be drawn into the spacing chamber 2414a. Moreover, since the movable portion 2413b of the resonance plate 2413 moves upwardly as well, the volume of the inlet hole 2411a of the base 2411 increases. In addition, as mentioned above, the fluid in the inlet hole 2411a starts to be drawn into the spacing chamber 2414a, so that the inlet hole 2411a also becomes in a negative pressure state. Hence, a large amount of fluid outside the fluid guiding unit 241 starts to be drawn into the inlet hole 2411a through the inlet port 2412a of the inlet plate 2412. Next, please refer to FIG. 3D, the piezoelectric element 2415e drives the vibration portion 2415a of the actuating element 2415 to move downwardly, and the movable portion 2413b of the resonance plate 2413 is driven to move downwardly correspondingly through the resonance effect. When the vibration portion 2415a moves downwardly, the fluid in the spacing chamber 2414a is pushed to flow to the outlet chamber 2416c quickly, so that the pressure of the outlet chamber 2416c is raised rapidly and the fluid in the outlet chamber 2416c starts to be discharged out through the outlet port 2416d. At the same time, since the fluid in the spacing chamber 2414a and the fluid in the outlet chamber 2416c are rapidly discharged out of the fluid guiding unit 241 through the outlet port 2416d, the spacing chamber 2414a and the outlet chamber 2416c become in a negative pressure state, so that the fluid outside of the fluid guiding unit 241 can continuously flow into the fluid guiding unit 241 through the inlet port 2412a. Repeating the above two steps will allow the fluid to continuously enter into the fluid guiding unit 241 from the inlet port 2412a, and then to pass through the inlet hole 2411a, the central perforation 2413a, the spacing chamber 2414a, the gaps 2415d, and the outlet chamber 2416c, and to be discharged through the outlet port 2416d. Accordingly, the fluid can be transmitted by the fluid guiding units 241.

Figure 4A:
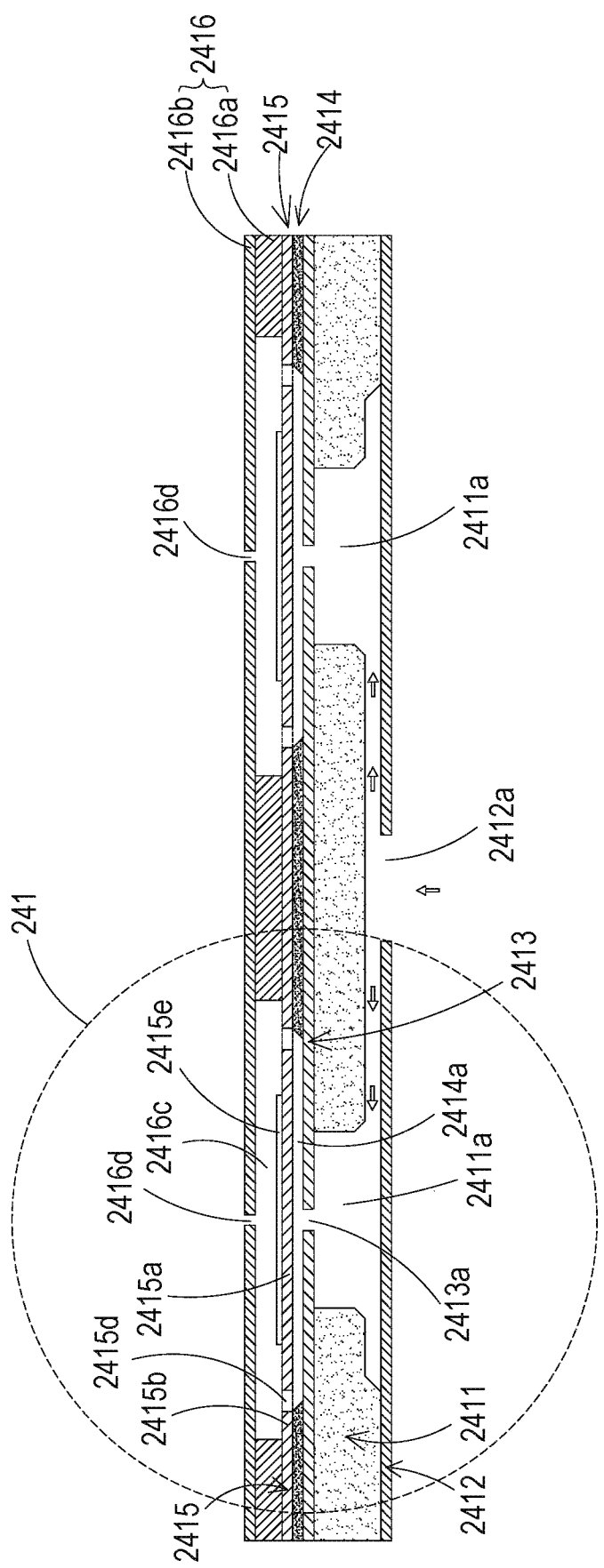
FIG. 4A illustrates a schematic cross-sectional view of two fluid guiding units arranged in parallel according to an exemplary embodiment of the present disclosure.

Please refer to FIG. 4A. FIG. 4A illustrates a schematic cross-sectional view of two fluid guiding units arranged in parallel according to an exemplary embodiment of the present disclosure. The fluid guiding units 241 of the present disclosure may be arranged in parallel to form the driving area 241A. FIG. 4A illustrates two fluid guiding units 241 as an example, but is not limited thereto. When the fluid guiding units 241 are arranged in parallel, adjacent fluid guiding units 241 may share the same base 2411, the same inlet plate 2412, the same resonance plate 2413, the same spacing element 2414, the same actuating element 2415, and the same outlet component 2416. Relating structures may first be formed at different areas on each of the components, and then a plurality of fluid guiding units 241 arranged in parallel can be obtained after the base 2411, the inlet plate 2412, the resonance plate 2413, the spacing element 2414, the actuating element 2415, and the outlet component 2416 are stacked on each other. It should be noted that the base 2411 has a main body and hollow portions therein. The main body of the base 2411 is a solid structure, and the hollow portions may be inlet holes 2411a. The inlet port 2412a corresponds to the main body of the base 2411. That is, the inlet port 2412a of the inlet plate 2412 is opened at a position corresponding to the main body of the base 2411, and the inlet port 2412a is aligned with the main body of the base 2411. At least two fluid guiding units 241 share the same inlet port 2412a. The gas introduced from the inlet port 2412a may flow to and contact the main body first, and then be divided into two streams of such gas. The two streams flow toward two opposite direction that is substantially parallel to the inlet plate 2412, as illustrated by the arrows in FIG. 4A.

Figure 4B:
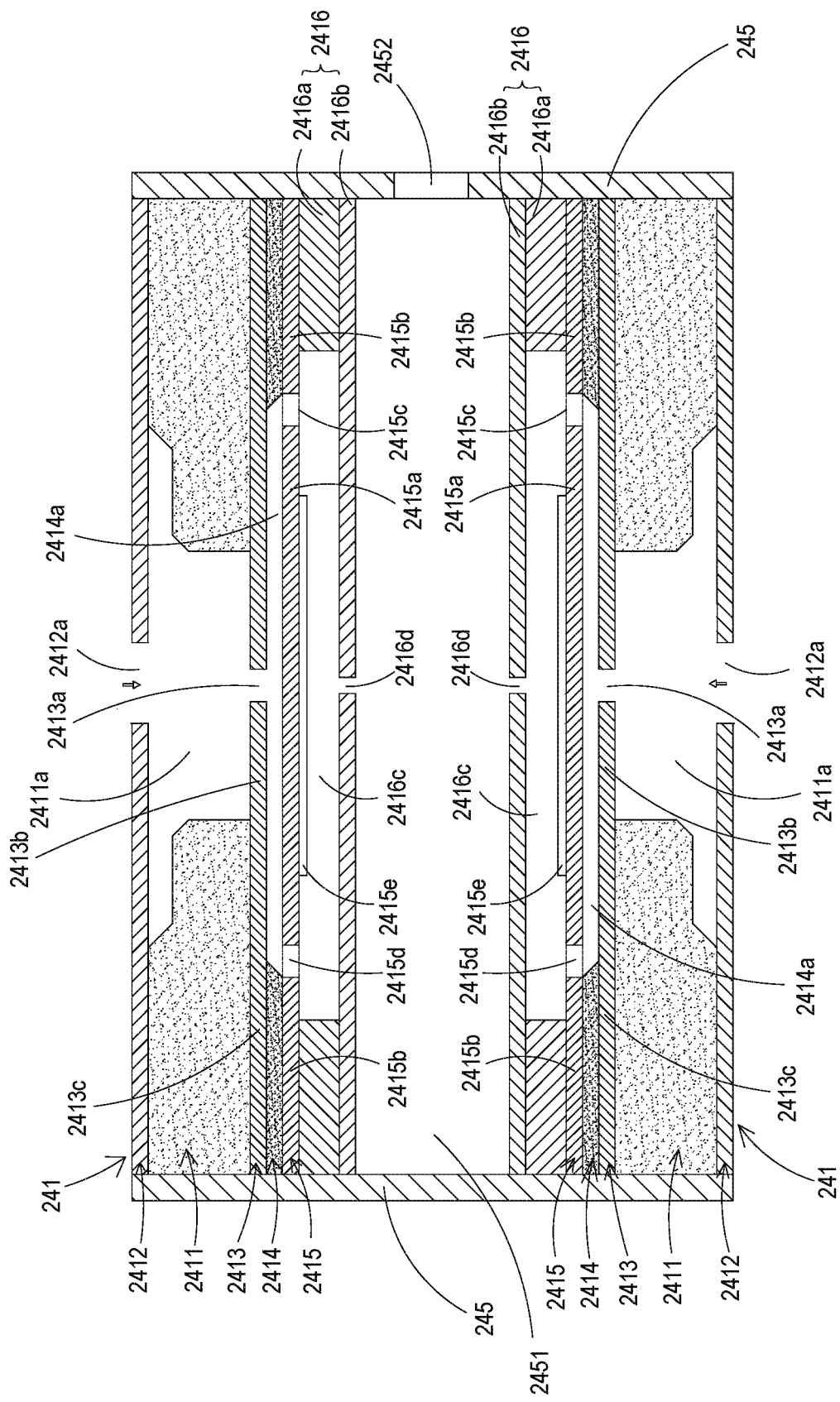
FIG. 4B illustrates a schematic cross-sectional view of two fluid guiding units arranged in series according to an exemplary embodiment of the present disclosure.

Please refer to FIG. 4B. FIG. 4B illustrates a schematic cross-sectional view of two fluid guiding units arranged in series according to an exemplary embodiment of the present disclosure. The fluid guiding units 241 of the present disclosure may be arranged in series to form the driving area 241A. FIG. 4B illustrates two fluid guiding units 241 as an example, but is not limited thereto. When the fluid guiding units 241 are arranged in series, the two fluid guiding units 241 are vertically spaced apart from each other and fixed by a fixing structure 245, and then a series chamber 2451 can be further defined between the two fluid guiding units 241. More specifically, at least two fluid guiding units 241 may be flanked by and disposed on the fixing structure 245, and the fluid guiding units 241 are perpendicular to the fixing structure 245 and are spaced apart from each other. Each component in one fluid guiding unit 241 is substantially parallel to the equivalent component in the other fluid guiding unit 241. For example, the outlet component 2416 of one fluid guiding unit 241 is parallel to the outlet component 2416 of the other fluid guiding unit 241. And, the space between two cover plate 2416b forms the series chamber 2451. Besides, the fixing structure 245 has a series outlet 2452. The series outlet 2452 is opened at a position corresponding to the series chamber 2451, and it makes the series outlet 2452 directly connect to the series chamber 2451. The fluid discharged from the two fluid guiding units 241 arranged in series can be first guided to/converge at the series chamber 2451, and then be discharged out of the fluid guiding units 241 together through the series outlet 2452.

Figure 4C:
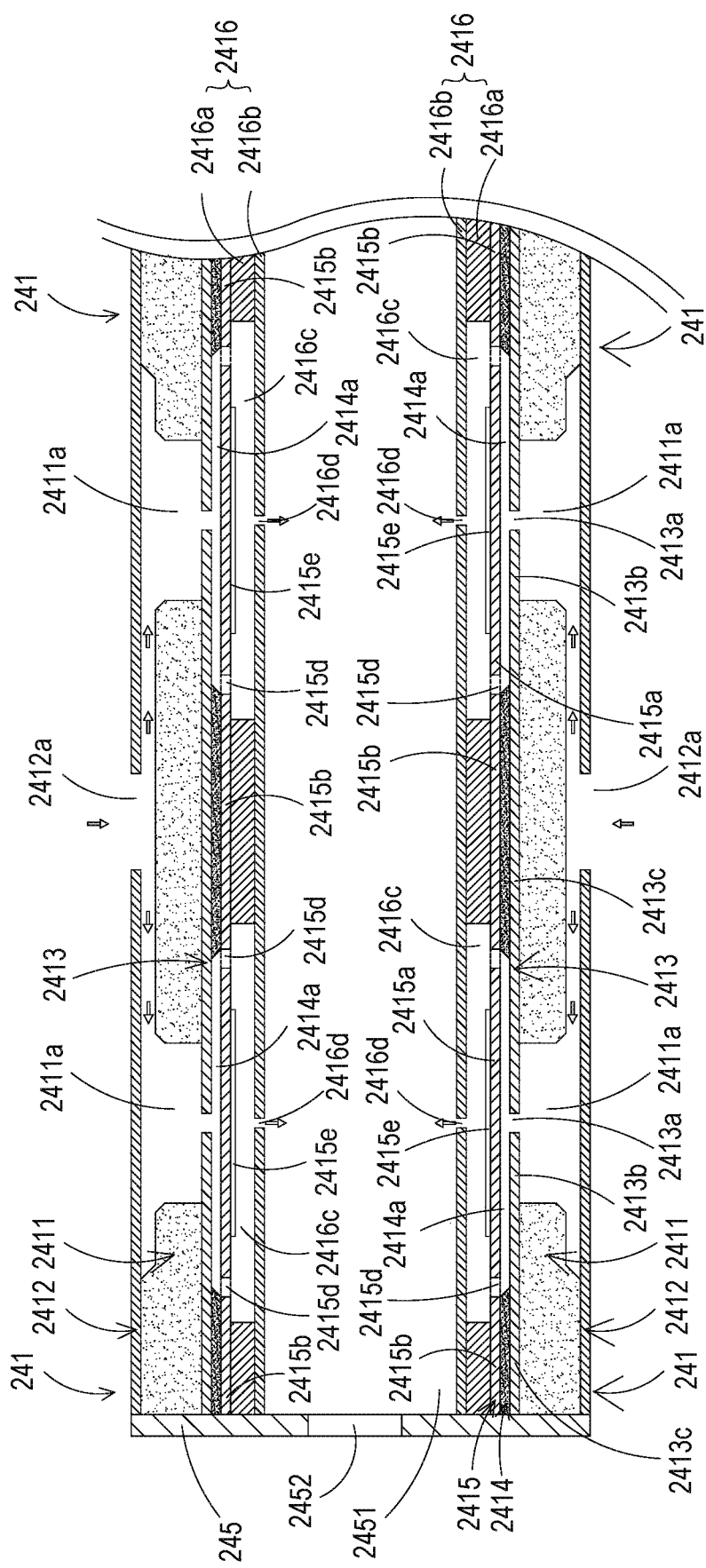
FIG. 4C illustrates a schematic cross-sectional view of four fluid guiding units arranged in series and parallel according to an exemplary embodiment of the present disclosure.

Please refer to FIG. 4C. FIG. 4C illustrates a schematic cross-sectional view of four fluid guiding units arranged in series and parallel according to an exemplary embodiment of the present disclosure. The fluid guiding units 241 of the present disclosure may be arranged in series and parallel to form the driving area 241A. The parallel arrangement of the fluid guiding units 241 in FIG. 4C may refer to FIG. 4A, and the series arrangement of the fluid guiding units 241 in FIG. 4C may refer to FIG. 4B. FIG. 4C illustrates four fluid guiding units 241 as an example, but is not limited thereto. The series-parallel connection may be formed by arranging the fluid guiding units 241 in parallel first, and then connecting the parallel-arranged fluid guiding units 241 in series through the fixing structure 245. Accordingly, the fluid to be discharged can be converged at the series chamber 2451 first, and then be discharged out of the fluid guiding units 241 through the series outlet 2452.

Figure 5A:
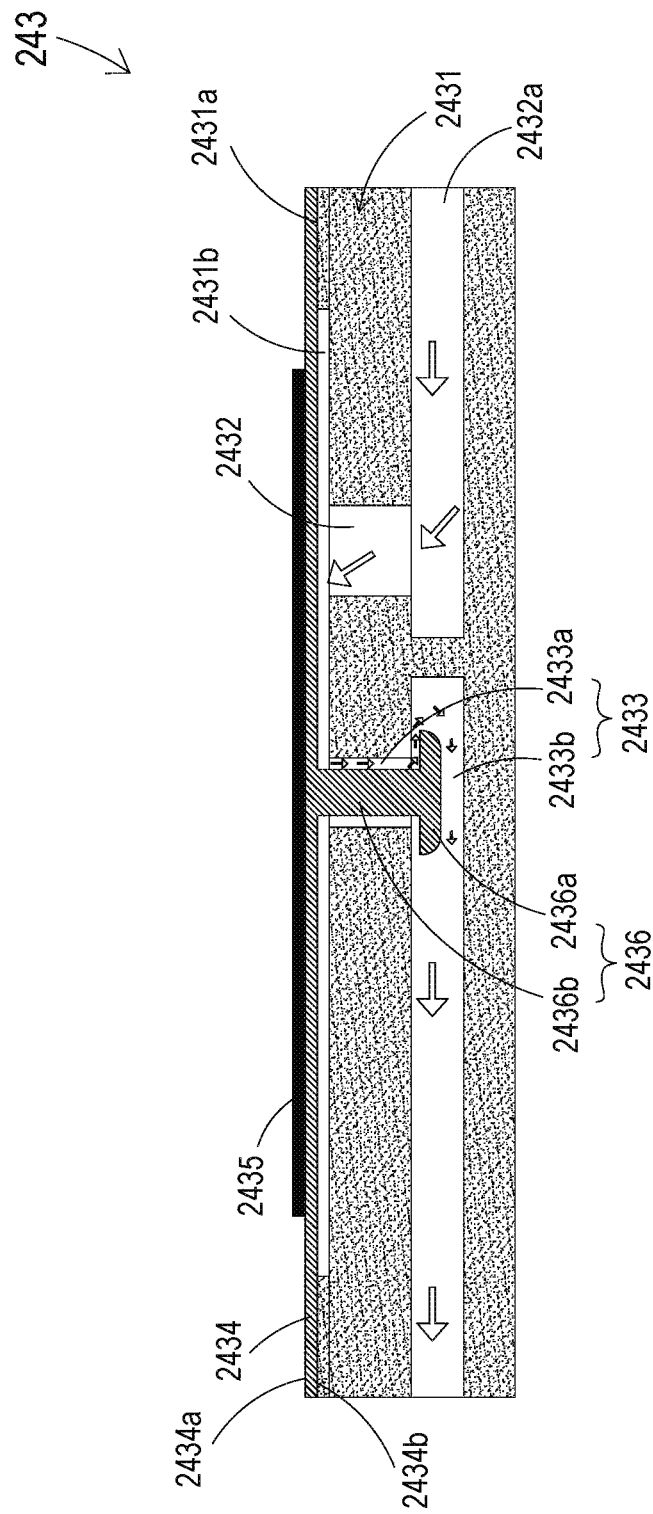
FIG. 5A illustrates a schematic cross-sectional view of a valve of the power actuator according to a first embodiment of the present disclosure.

Please refer to FIG. 5A. FIG. 5A illustrates a schematic cross-sectional view of a valve of the power actuator according to a first embodiment of the present disclosure. According to some embodiments, each of the valves 243 may include a channel base 2431, a first channel 2432, a second channel 2433, an actuating plate 2434, a piezoelectric plate 2435, and a closing component 2436. The channel base 2431 has a channel base surface 2431a, and the channel base surface 2431a is recessed to form a valve chamber 2431b. The first channel 2432 is in the channel base 2431, and one of two ends of the first channel 2432 is served as a fluid entering port 2432a for connecting to the driving area 241A. The other end of the two ends of the first channel 2432 communicates with the valve chamber 2431b. The second channel 2433 is also in the channel base 2431 and has a communication area 2433a and an outlet area 2433b. The communication area 2433a may be perpendicular to the outlet area 2433b and communicates with the outlet area 2433b. The communication area 2433a is between the outlet area 2433b and the valve chamber 2413b. One of two ends of the communication area 2433a communicates with the outlet area 2433b, and the other end of the two ends of the communication area 2433a communicates with the valve chamber 2413b, so that the outlet area 2433a is in communication with the valve chamber 2413b. The actuating plate 2434 is disposed on the channel base surface 2431a and covers the valve chamber 2413b. The actuating plate 2434 has as a first actuating surface 2434a and a second actuating surface 2434b, and the first actuating surface 2434a and the second actuating surface 2434b may be opposite to each other. The piezoelectric plate 2435 is attached to the first actuating surface 2434a. The closing component 2436 has a blocking part 2436a and a connecting lever 2436b. The blocking part 2436a is disposed in the outlet area 2433b of the second channel 2433 and corresponds to the communication area 2433a. The connecting lever 2436b penetrates the communication area 2433a of the second channel 2433. One of two ends of the connecting lever 2436b is connected to the blocking part 2436a, and the other end of the two ends of the connecting lever 2436b is connected to the second actuating surface 2434b of the actuating plate 2434. The cross-sectional area of the blocking part 2436a is greater than the cross-sectional area of the communication area 2433a, and the length of the connecting lever 2436b is greater than the length of the communication area 2433a.

Figure 5B:
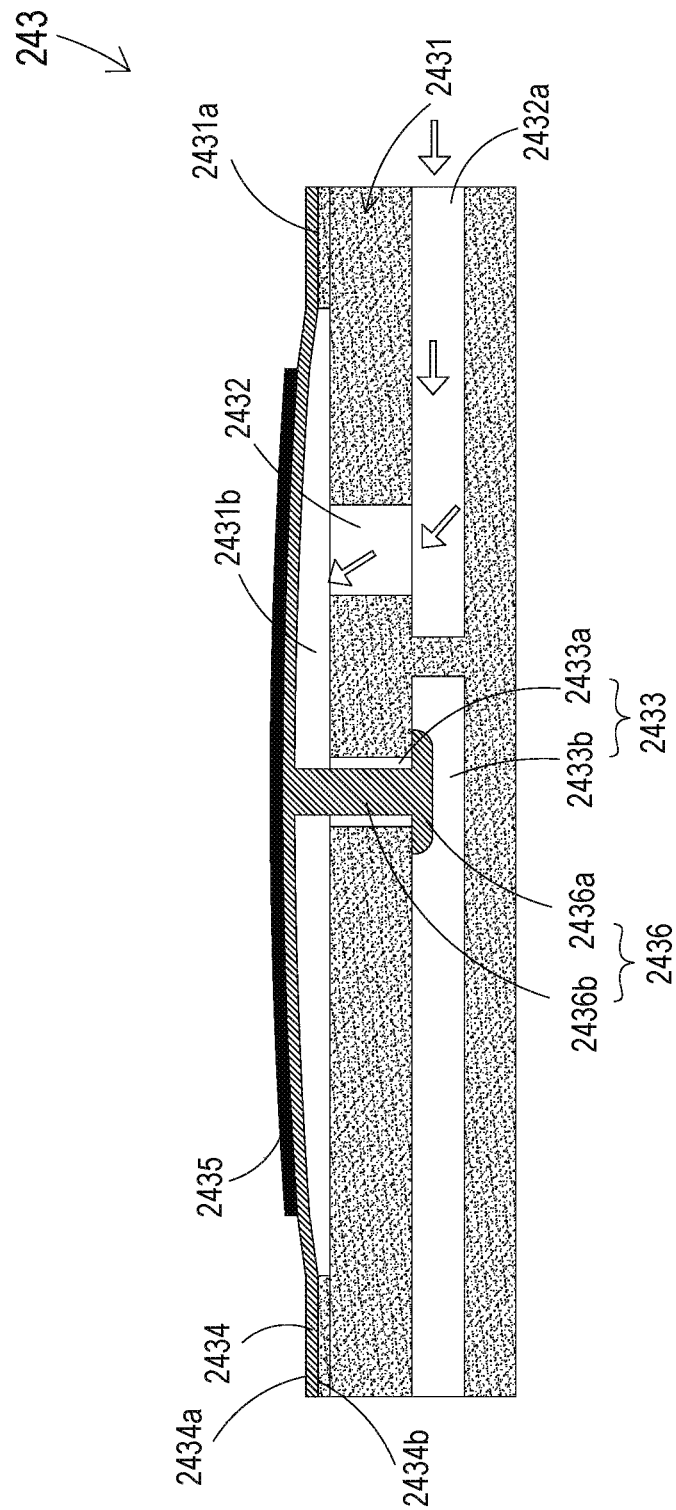
FIG. 5B illustrates a schematic cross-sectional view of the valve of the power actuator at different operation steps according to the first embodiment of the present disclosure.

According to the previous descriptions, when the piezoelectric plate 2435 has not started operating yet, the valve 243 is in an open state (as shown in FIG. 5A). Since the length of the connecting lever 2436b is greater than the summation of the length of the communication area 2433a and the depth of the valve chamber 2431b, when the actuating plate 2434 is in horizontal position, the blocking part 2436a does not seal the junction between the communication area 2433a and the outlet area 2433b. That is, the connecting lever 2436b is longer than the summation of the length of the communication area 2433a and the depth of the valve chamber 2431b, and the connecting lever 2436b penetrates and extends beyond the communication area 2433a. Thus, the communication area 2433a can communicate with the outlet area 2433b. Therefore, the fluid can enter into the valve 243 from the fluid entering port 2432a of the first channel 2432, pass through the valve chamber 2431b, and can be discharged out of the valve 243 from the communication area 2433a and the outlet area 2433b. Next, please refer to FIG. 5B. FIG. 5B illustrates a schematic cross-sectional view of the valve of the power actuator at different operation steps according to the first embodiment of the present disclosure. When the piezoelectric plate 2435 deforms and drives the actuating plate 2434 to bend away from the channel base 2431, the connecting lever 2436b of the closing component 2436 is pulled up, so that the blocking part 2436a of the closing component 2436 abuts against the channel base 2431 at the junction between the communication area 2433a and the outlet area 2433b so as to close communication area 2433a. Thus, the valve 243 is closed as well. By the mechanism mentioned above, the opening or closing of the valve 243 can be controlled through the piezoelectric plate 2435 so as to further control the flow rate and the pressure of the fluid flowing into the convergence chamber 244.

Figure 6A:
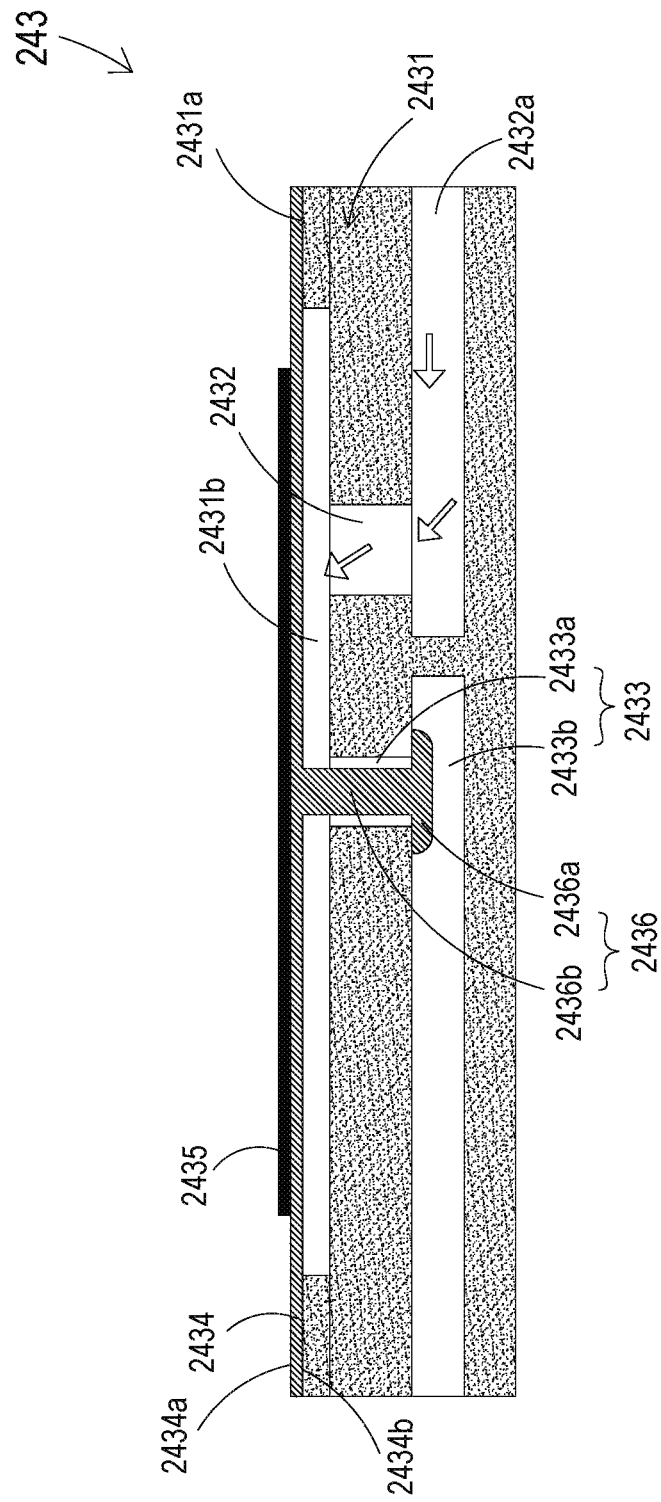
FIG. 6A illustrates a schematic cross-sectional view of a valve of the power actuator according to a second embodiment of the present disclosure.
Figure 6B:
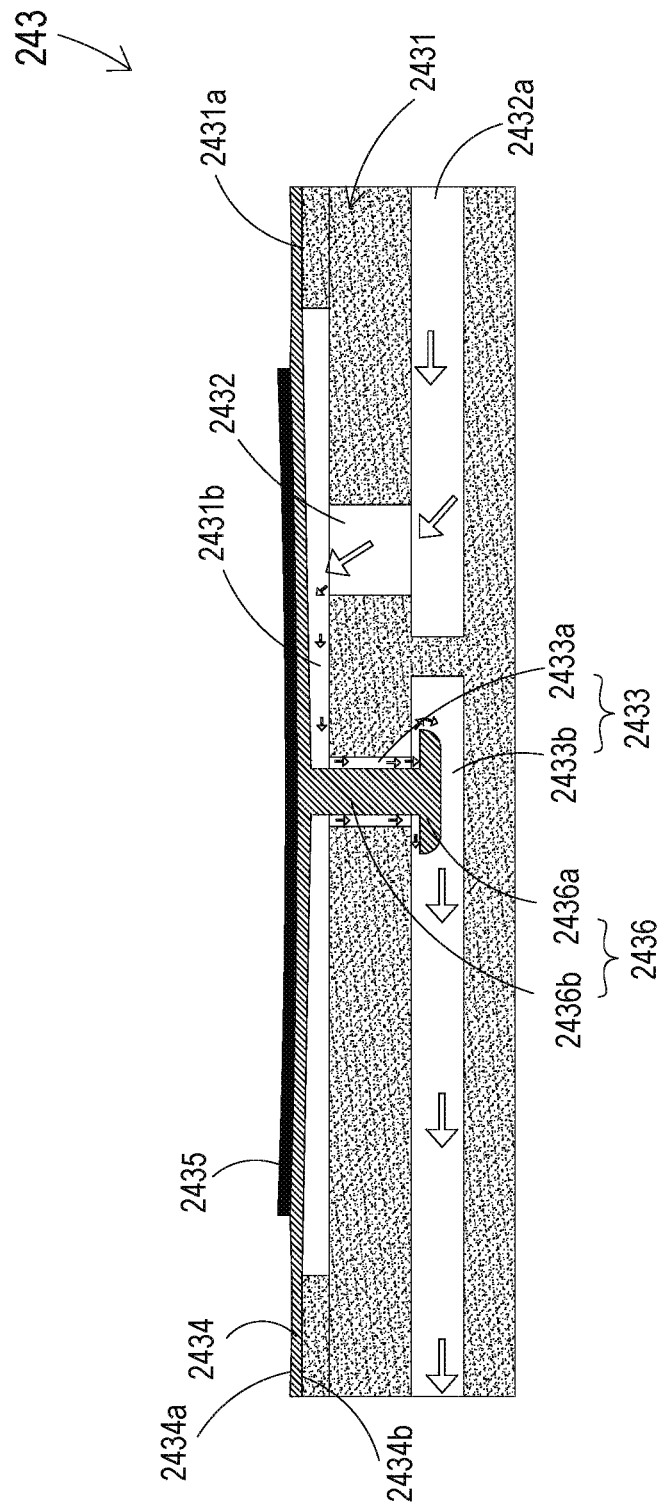
FIG. 6B illustrates a schematic cross-sectional view of the valve of the power actuator at different operation steps according to the second embodiment of the present disclosure.

Please refer to FIG. 6A. FIG. 6A illustrates a schematic cross-sectional view of a valve of the power actuator according to a second embodiment of the present disclosure. The structure of the second embodiment is substantially the same as that of the previous embodiment, and therefore the parts substantially the same will not be described here again. One of the differences between the second embodiment and the first embodiment is that, the length of the connecting lever 2436b in this embodiment is equal to the summation of the length of the communication area 2433a and the depth of the valve chamber 2431b. Therefore, when the piezoelectric plate 2435 has not started operating yet, the blocking part 2436a abuts against the channel base 2431 at the junction between the communication area 2433a and the outlet area 2433b. That is, the blocking part 2436a abuts against the channel base 2431 at the position where the communication area 2433a connects to the outlet area 2433b. Since the communication area 2433a and the outlet area 2433b are disconnected from each other by the blocking part 2436a, the fluid cannot pass therebetween, so that the valve is in a closed state. In other words, the valve 243 of this embodiment is normally closed. Next, please refer to FIG. 6B. When the piezoelectric plate 2435 deforms and the actuating plate 2434 is driven to bend toward the channel base 2431, the connecting lever 2436b of the closing component 2436 is pushed at the same time, so that the blocking part 2436a of the closing component 2436 will be pushed away from the position where the communication area 2433a connects to the outlet area 2433b. Thus, the communication area 2433a and the outlet area 2433b are in communication with each other, and the valve 243 is opened correspondingly. Similar to the first embodiment, this embodiment also uses the piezoelectric plate 2435 to control the opening or closing of the valve 243 for further controlling the flow rate and pressure of the fluid flowing into the convergence chamber 244.

Please refer back to FIG. 2A. The mobile vehicle 2 may further include a power source 27. The power source 27 is electrically connected to the processor 22, the second wireless communication module 23, the power actuator 24, the recording unit 25, and the fluid detecting unit 26 for providing power to each component. The power source 27 may be a graphene battery, a solar cell, or a rechargeable battery.

Moreover, the fluid detecting unit 26 may be a gas detecting unit. The gas detecting unit may include at least one selected from a group consisting of an oxygen sensor, a carbon monoxide sensor, and a carbon dioxide sensor. In some embodiments, the gas detecting unit may include a volatile organic compound sensor. In some embodiments, the gas detecting unit may include at least one selected from a group consisting of a bacteria sensor, a virus sensor, and a microorganism sensor. In some embodiments, the gas detecting unit may include at least one selected from a temperature sensor and a humidity sensor. The gas detecting unit may also be a particle sensor; or the gas detecting unit may also be an ozone sensor.

In some embodiments, the fluid detecting unit 26 may also be a liquid sensor. The liquid sensor may include at least one selected from a group consisting of a turbidity sensor, a water quality sensor, a water conductivity sensor, and a dissolved oxygen sensor.

The fluid detecting unit 26 can be used to detect various types of fluid so as to generate corresponding information, such as gas information or liquid information. Then, the detection information will be transmitted back to the user end (controller 1) by the second wireless communication module 23. Thereby, the user can know the environmental information of the location where the mobile vehicle 2 locates at and can confirm whether the environmental information of the target location affects the human body or not.

To sum up, the present disclosure provides a micro detecting device. According to one or some embodiments of the present disclosure, the micro detecting device utilizes a power actuator including a plurality of fluid guiding units, a plurality of fluid guiding channels, a plurality of valves, and a convergence chamber to push a mobile vehicle by a pushing force generated by transmitting the fluid, so that the mobile vehicle can move by the pushing force. Moreover, a recorded signal during the movement is provided by a recording unit disposed on the mobile vehicle and is transmitted back to a controller at a user end. The environmental information of the location where the micro detecting device locates at, such as the air information or the water quality information, is detected by the fluid detecting unit. Thereby, the user can understand the environmental information conveniently. Besides, since the fluid guiding units are used as the power actuator, the size and the weight of the mobile vehicle can be reduced, by which the present disclosure reduces the limitations of the environment and region for the mobile vehicle and thus is beneficial to the mobile vehicle. Thus, the mobile vehicle is able to be used in more occasions, such as a fire scene. Hence, not only the situation of the site can be understood by the recording unit, but also the gas information of the site can be confirmed by the fluid detecting unit, so that the rescue difficulty can be reduced. The industrial value of the present application is very high, so the application is submitted in accordance with the law.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A micro detecting device, comprising:
   a controller having a first wireless communication module; and
   a mobile vehicle, comprising:
      a vehicle body;
      a processor accommodated in the vehicle body;
      a second wireless communication module accommodated in the vehicle body and electrically connected to the processor, wherein the second wireless communication module is configured to establish a communication connection with the first wireless communication module to receive a control signal from the controller;
      a power actuator disposed on the vehicle body and electrically connected to the processor for driving the vehicle body;
      a recording unit disposed on the vehicle body and electrically connected to the processor and the second wireless communication module, wherein the recording unit is configured to generate a recorded signal; and
      a fluid detecting unit disposed on the vehicle body and electrically connected to the processor and the second wireless communication module, wherein the fluid detecting unit is configured to generate a detection signal;
   wherein the power actuator comprises:
      a plurality of fluid guiding units, wherein an area where the plurality of fluid guiding units lies forms a driving area;
      a plurality of fluid guiding channels connected to the plurality of fluid guiding units, respectively;
      a plurality of valves connected to the plurality of fluid guiding channels, respectively; and
      a convergence chamber connected to the plurality of valves;
      wherein the plurality of fluid guiding units draws a fluid and guide the fluid into the plurality of fluid guiding channels, and the plurality of valves is configured to control the fluid in the plurality of fluid guiding channels to be converged in the convergence chamber, whereby the power actuator drives the mobile vehicle to move through continuously operation of drawing and discharging the fluid.

2. The micro detecting device according to claim 1, wherein the plurality of fluid guiding units is arranged in series in the driving area.

3. The micro detecting device according to claim 1, wherein the plurality of fluid guiding units is arranged in parallel in the driving area.

4. The micro detecting device according to claim 1, wherein the plurality of fluid guiding units is arranged in series and parallel in the driving area.

5. The micro detecting device according to claim 1, the recording unit is an infrared detecting unit.

6. The micro detecting device according to claim 1, wherein each of the plurality of fluid guiding units comprises:
   a base having an inlet hole;
   an inlet plate disposed on the base, and the inlet plate has at least one inlet port, wherein the at least one inlet port communicates with the inlet hole;
   a resonance plate disposed on the base and opposite to the inlet plate, wherein the resonance plate has a central perforation, a movable portion and a fixation portion, wherein the central perforation is at a center portion of the resonance plate and perpendicularly corresponds to the inlet hole of the base, the movable portion is disposed around the periphery of the central perforation and corresponds to the inlet hole so that the movable portion is capable of vibrating upwardly and downwardly at the inlet hole, and the fixation portion is disposed around the periphery of the resonance plate and thereby the resonance plate is fixed to the base through the fixation portion;
   a spacing element disposed at the fixation portion of the resonance plate, wherein a center portion of the spacing element is recessed, so that the center portion of the spacing element and the resonance plate together define a spacing chamber;
   an actuating element disposed on the spacing element, wherein the actuating element has a vibration portion, an outer frame portion, a plurality of connecting portions, a plurality of gaps and a piezoelectric element, wherein the vibration portion is at a center portion of the actuating element and perpendicularly corresponds to the spacing chamber, the plurality of connecting portions is disposed and connected between the vibration portion and the outer frame portion for providing a flexible support for the vibration portion, and the plurality of gaps are formed among the vibration portion, the outer frame portion and the plurality of connecting portions for allowing the fluid to flow therethrough, and wherein the piezoelectric element is attached on the vibration portion; and
   an outlet component having a frame plate and a cover plate, wherein the frame plate is stacked on the outer frame portion of the actuating element, a center portion of the frame plate is recessed so that the center portion of the frame plate and the vibration portion of the actuating element together define an outlet chamber, and the cover plate has an outlet port at a center portion thereof and is stacked on the frame plate,
   wherein when the piezoelectric element is deformed owing to piezoelectric effect, the piezoelectric element drives the vibration portion of the actuating element to vibrate upwardly and downwardly between the outlet chamber and the spacing chamber so that a volume of the outlet chamber and a volume of the spacing chamber are changed, and a pressure difference between the outlet chamber and the spacing chamber is generated, whereby the fluid flows into the fluid guiding unit from the at least one inlet port, passes through the inlet hole, the central perforation, the plurality of the gaps and the outlet chamber, and then is discharged out of the fluid guiding unit from the outlet port.

7. The micro detecting device according to claim 1, wherein each of the plurality of the valves comprises:
   a channel base having a channel base surface, and the channel base surface is recessed to form a valve chamber;
   a first channel formed in the channel base and being in communication with the valve chamber;
   a second channel formed in the channel base and having a communication area and an outlet area, wherein the communication area is between the outlet area and the valve chamber, so that the outlet area is in communication with the valve chamber;
   an actuating plate disposed on the channel base surface and covering the valve chamber, wherein the actuating plate has a first actuating surface and a second actuating surface;

a piezoelectric plate attached to the first actuating surface; and a closing component having a blocking part and a connecting lever, wherein the blocking part is disposed in the outlet area of the second channel and corresponds to the communication area, the connecting lever penetrates the communication area of the second channel, and wherein one of two ends of the connecting lever is connected to the blocking part, and the other end of the two ends of the connecting lever is connected to the second actuating surface of the actuating plate, wherein a cross-sectional area of the blocking part is greater than a cross-sectional area of the communication area, and a length of the connecting lever is greater than a length of the communication area.

8. The micro detecting device according to claim 1, wherein the controller is a portable electronic device.

9. The micro detecting device according to claim 8, wherein the portable electronic device is a smart phone, a tablet computer, or a notebook computer.

10. The micro detecting device according to claim 1, further comprising:

a power source electrically connected to the processor, the second wireless communication module, the power actuator, the recording unit, and the fluid detecting unit.

11. The micro detecting device according to claim 10, wherein the power source is a graphene battery, a solar cell, or a rechargeable battery.

12. The micro detecting device according to claim 1, wherein the fluid detecting unit is a liquid sensor.

13. The micro detecting device according to claim 12, wherein the liquid sensor comprises at least one selected from a group consisting of a turbidity sensor, a water quality sensor, a water conductivity sensor, and a dissolved oxygen sensor.

14. The micro detecting device according to claim 1, wherein the fluid detecting unit is a gas detecting unit.

15. The micro detecting device according to claim 14, wherein the gas detecting unit comprises at least one selected from a group consisting of an oxygen sensor, a carbon monoxide sensor, and a carbon dioxide sensor.

16. The micro detecting device according to claim 14, wherein the gas detecting unit comprises a volatile organic compound sensor.

17. The micro detecting device according to claim 14, wherein the gas detecting unit comprises at least one selected from a group consisting of a bacteria sensor, a virus sensor, and a microorganism sensor.

18. The micro detecting device according to claim 14, wherein the gas detecting unit is a particle sensor or an ozone sensor, or a combination thereof.

* * * * *